May 2, 1961  O. FISCHER  2,982,190
MECHANICAL SCANNING DEVICE FOR THE POINTER
POSITION OF A PHOTOGRAPHIC EXPOSURE METER
Filed Jan. 13, 1960  3 Sheets-Sheet 1
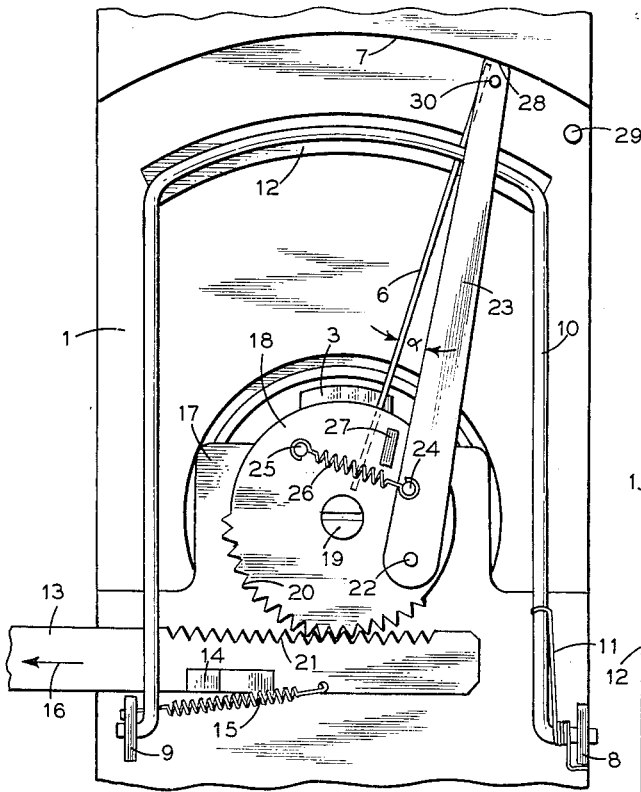
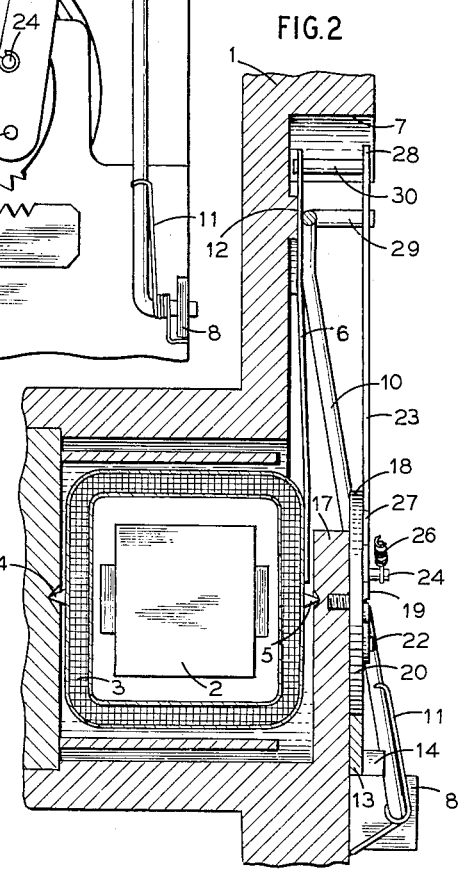
INVENTOR.
Oskar Fischer
BY Blum, Moscovitz,
Friedman & Blum
ATTORNEYS INVENTOR.
Oskar Fischer

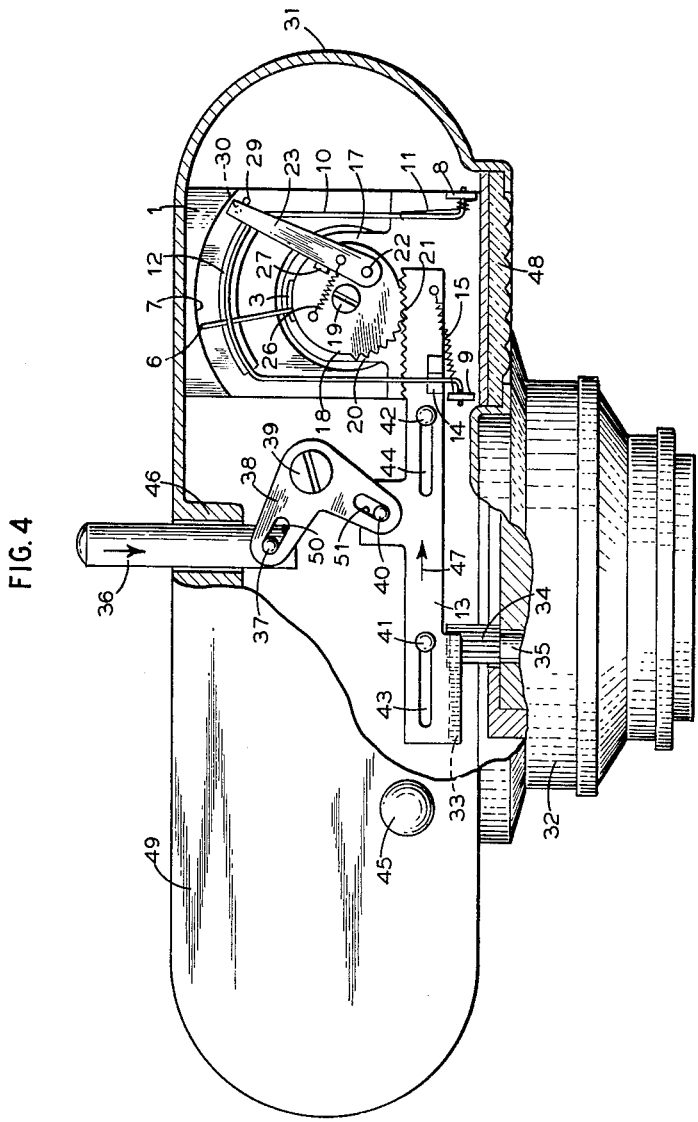

United States Patent Office 2,982,190
Patented May 2, 1961

2,982,190

MECHANICAL SCANNING DEVICE FOR THE POINTER POSITION OF A PHOTOGRAPHIC EXPOSURE METER

Oskar Fischer, Volkmarode, Germany, assignor to Voigtlander A.G., Braunschweig, Germany, a corporation of Germany Filed Jan. 13, 1960, Ser. No. 2,267
Claims priority, application Germany Jan. 23, 1959
8 Claims. (Cl. 95—10)

This invention relates to a mechanical scanning device and it has particular relation to a device for scanning the arrestable measuring position of an instrument pointer, for example the pointer of an electric exposure meter, particularly an exposure meter built-in in a photographic camera.

Devices for the mechanical scanning of the arrested position of a movable indicating pointer, such as the pointer of an electric exposure meter built into a photographic camera and used for automatic adjustment of exposure conditions, having previously been proposed in various forms. These proposals have resulted from efforts to develop practical arrangements for effecting automatic adjustment of an exposure condition controlling member, such as the shutter exposure time adjusting means or the objective diaphragm aperture adjusting means of a photographic camera, by power means and in coordination with the position of an indicating component of an exposure meter, taking into consideration that the pointer of the exposure meter is a highly sensitive device.

Known arrangements of this type effect either step by step scanning or continuous scanning. Those arrangements involving step by step scanning use suitable means for temporarily locking the pointer or indicator of the exposure meter in its indicating position. For example, the locking means may comprise elements having serrated or milled surfaces engaging the pointer, lamellae or keys positioned in accordance with the indicating position of the pointer and serving as stops for the scanning means, oscillatable stepped disks movable with the pointer, scanning members having pawls arranged to engage notches in an element movable with the pointer, and the like. All of the arrangements operating on the principle of step by step scanning have the disadvantage of inadequate precision of adjustment, which is of particular importance in color photography as the latter requires most exact adjustment of the photographic exposure conditions.

In addition to manually operable so-called semi-automatic follow-up arrangements, of the type in which a follow-up pointer connected with the exposure condition adjusting member is brought visually and manually into coincidence with the exposure meter pointer, arrangements involving continuous scanning of the position of an exposure meter indicating pointer have been known. In some of these constructions, the indicating pointer, which has been arrested in adjusted position by suitable clamping means, has been used directly as a fixed stop for a scanning means which may be operated, for example, by a spring. In these arrangements, mechanical overstressing of the highly sensitive pointer and of the entire measuring instrument may occur, resulting in damage to the pointer and to the instrument bearings with the result that defective adjustments may ensue.

Other known constructions involve relatively movable members having inclined surfaces, or pivotally interconnected jaws, between which the instrument pointer is clamped. In these arrangements, the inclination of the surface of one of these members relative to that of the other determines the limit of movement of the scanning device toward the pointer, this relative inclination being dependent upon the indicating position of the pointer in any particular case. This method has the disadvantage that either the pointer, when clamped, is moved by a greater or lesser amount from its actual indicating position, or the inclination of the surface serving as the means for limiting the movement of the scanning device is too small, in certain measuring ranges, to provide a stop position exactly corresponding to the position of the indicating pointer.

The main object of the present invention is to provide a mechanical scanning device, in which the above described disadvantages or defects of the known scanning devices are eliminated and, in a simple manner, a reliable adjustment of the follow-up adjuster, which exactly corresponds to the measuring position of the instrument pointer, can always be obtained with certainty. This object is attained by the use of a mechanical scanning device which includes a carrier element rotatable about a stationary axis, and a circular arcuate clamping surface facing the carrier element and concentric therewith. A relatively elongated scanning lever or pointer is pivoted to the carrier element eccentrically thereof, and is biased by a weak spring to engage a stop on the carrier element, this stop limiting the scanning lever to a position in which it extends non-radially toward the clamping surface and has its free end spaced a short distance from the clamping surface. The angle of the scanning lever to a radius of the clamping surface is smaller than the critical angle of friction between the end of the scanning lever and the clamping surface.

When the carrier element is rotated, during adjustment or setting of the exposure condition controlling components of the camera, the scanning lever remains in contact with its stop, and with its free ends spaced such short distance from the arcuate clamping surface, until such time as the scanning lever engages the indicating pointer of the exposure meter. At the latter time, the scanning lever is slightly deflected, relative to the carrier element and away from its stop, so that its free end engages the clamping surface and locks the scanning element, the carrier element, and the other components of the adjusting means against further movement.

The appended drawings diagrammatically illustrate some specific embodiments of and a best mode for carrying out the invention, to which the invention is not limited.

In the appended drawings

Fig. 1 is a top plan view of one embodiment of the invention;

Fig. 2 is a vertical sectional view through the embodiment of Fig. 1, looking from the left of this figure;

Fig. 4 is a top plan view, partly broken away, of a photographic camera having the scanning means of the present invention incorporated therein.

Figure 3:
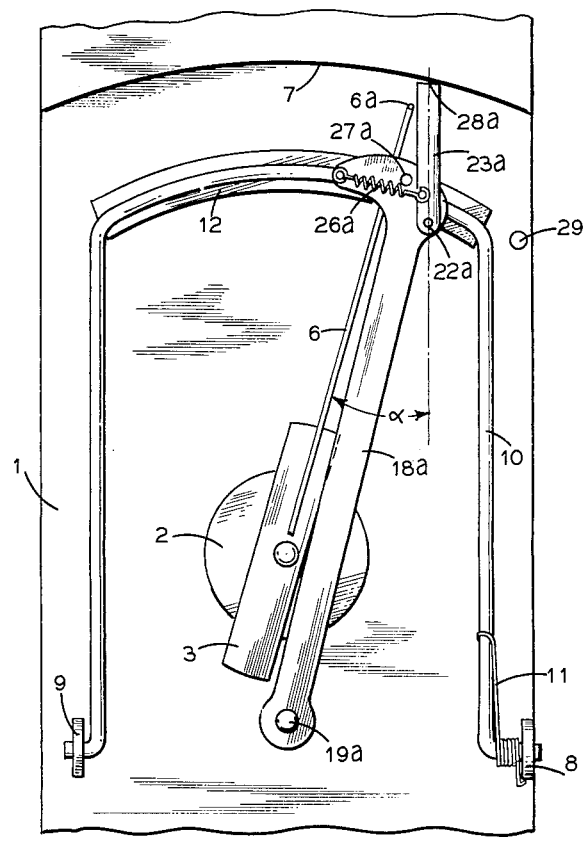
Fig. 3 is a view similar to Fig. 1 illustrating another embodiment of the invention.

Referring now to the drawings in detail, in Figs. 1 and 2, in a base member or housing compartment 1 in which is mounted a conventional rotating coil instrument of an exposure meter, including a magnet 2 and a rotating coil 3, the latter being mounted in bearings 4 and 5. Fastened to the rotating coil 3 is instrument pointer 6, the point of which moves in front of a circular surface 7, forming part of member 1 and serving as a clamping surface. Oscillatably arranged in bearing blocks 8 and 9 of base member 1 is a bow or frame member 10, which is biased by spring 11 to press instrument pointer 6 against supporting surface 12 to arrest the pointer in its measuring or indicating position. Below member 10, a slide 13 is movably mounted on member 1 and has a raised portion with an inclined surface 14 ascending from left to right. In its rest position, this slide 13 is drawn by spring 15 to the left—i.e. in the direction of arrow 16—to such an extent that the inclined surface 14 is located below the left arm of member 10 and thereby somewhat raises the latter. In this lifted position of member 10, the instrument pointer 6 can freely move above the supporting surface 12.

The bearing 5 of movable coil 3 engages a bearing recess in an extension 17 of member 1. A circular disk 18, constituting the carrier element, is rotatably mounted on extension 17 coaxial with bearing 5, disk 18 being rotatable about an axle comprising a screw 19. A peripheral sector of disk 18 is formed with gear teeth 20 meshing with a rack 21 on slide 13. A pin 22 is secured to disk 18 eccentrically to the axis of the latter, and a follow-up pointer 23 is pivotally mounted on pin 22. A relatively weak tension spring 26, which is fastened between a pin 24 of follow-up pointer 23 and a pin 25 of disk 18, biases follow-up pointer 23 toward a stop 27 on disk 18. When follow-up pointer 23 engages stop 27, its free end 28 is spaced a short distance from clamping surface 7 of base member 1. The angle α formed by follow-up pointer 23 and the radius of clamping surface 7 is smaller than the angle of friction between these two parts. In the rest position of the follow-up arrangement, the slide 13 is drawn by spring 15 to the left—i.e. in the direction of arrow 16—to such an extent that, on the one hand, its inclined surface 14 is located below the left arm of frame member 10, so that it somewhat lifts the same, and, on the other hand, the follow-up pointer 23 engages the stationary stop 29 on the member 1. In this position the instrument pointer 6 can move freely through its measuring range.

If a light measurement is now effected, the instrument pointer 6 will have a certain deflection in dependence on the measured light conditions. If, now, either by hand or by the release of an automatic exposure system provided for in the camera, the slide 13 is moved against the direction of arrow 16 to the right, the inclined surface 14 slides away from below the left arm of frame member 10, whereupon member 10 presses measuring pointer 6 against surface 12 and arrests the same in its measuring position. At the same time, slide 13 turns, through rack 21 and gear teeth 20, the circular disk 18 and thus acts on follow-up pointer 23 so that the latter is moved, with its free end 28 spaced a small distance from clamping surface 7, away from its stationary stop 29 to the left toward instrument pointer 6. The follow-up pointer 23 is provided on its free end with a downwardly projecting pin 30 which extends into the range of movement of instrument pointer 6. If member 30 very slightly touches the arrested instrument pointer 6, the follow-up pointer 23 will be moved, against the weak effect of spring 26, away from its stop 27 and its free end 28 will abut, practically at the same moment, against the stationary clamping surface 7. The stronger the scanning pressure acting on slide 13 in a direction opposite to arrow 16, the greater will be the clamping of end 28 of follow-up pointer 23 against the stationary clamping surface 7. Thereby, all adjusting means connected with slide 13—for example those of any exposure factor adjusters on the camera, such as time adjusting ring, diaphragm adjusting ring, or exposure value adjusting ring—will be accurately adjusted to correspond to the adjustment value indicated by measuring pointer 6. These adjustment movements can now be arrested—in a manner known per se by additional means which do not form the subject matter of the present invention—until, for example, the camera shutter is released and the photographic picture is taken. After release of the camera shutter this arrested position can be automatically terminated so that the follow-up pointer, and together with it the complete scanning arrangement according to the invention, can be returned to its rest position. This can be done, for example, by spring 15 moving slide 13 to the left until the follow-up pointer 23 engages stationary stop 29.

A somewhat modified embodiment of the invention is illustrated in Fig. 3. This embodiment differs from that according to Figs. 1 and 2 in that first, the scanning device is not coaxially arranged with the rotating coil instrument and second, that the parts of the scanning device are of different design. The operating mechanism for scanning substantially corresponds to that shown in Fig. 1 and is, therefore, not illustrated in detail in Fig. 3. Instead of the disk 18 shown in Fig. 1, there is provided an arm 18a pivotally mounted at 19a. During scanning, arm 18a is moved away from its stationary stop 29 to the left. This movement can be effected for example, in a manner similar to that described in connection with Fig. 1, i.e. by means of a rack meshing with gear teeth on a sector fixedly connected with arm 18a, or by a direct drive on shaft 19a. A pointer-like member 23a is pivotally mounted, at 22a, on the free end of arm 18a and is biased by a relatively weak tension spring 26a to engage a stop 27a on arm 18a. When member 23a is engaged with stop 27a, the free end 28a of member 23a is spaced a slight distance from clamping surface 7. This arm 23a stands, exactly like follow-up pointer 23 in Fig. 1, at an angle α relative to a perpendicular to stop surface 7 and angle α is smaller than the angle of friction between these two parts. In the embodiment of Fig. 3 the instrument pointer 6 is bent upwards at its free end 6a so that this bent pointer end 6a projects into the path of motion of follow-up arm 23a. If arm 23a comes in contact with pointer end 6a during the follow-up step, it will be moved—against the weak effect of spring 26a—away from its stop 27a and its free end 28a will be clamped immovably against clamping surface 7. Therefore, in this case too, in a manner similar to that described in connection with Figs. 1 and 2, a safe following-up to the measuring value of the instrument of adjusting members which are in operative connection with arm 18a, is accurately attained. The rest position of the scanning arrangement will be restored, after release of the camera shutter, by returning arm 18a into engagement with stop 29. This can be effected, for example, in the same manner as described in connection with Fig. 1.

Fig. 4 illustrates a photographic camera, under the broken away cap 49 of which the structure of a scanning device according to Fig. 1 can be seen, this device being in operative connection with the objective shutter. The scanning device has a separate operating handle which is shown as a control knob 36 arranged in a stationary bearing 46 in the camera.

As long as member 36 is in the position shown in Fig. 4, the exposure meter pointer 6 can freely move. The exposure meter pointer 6 is connected—like in Fig. 1—with the rotating coil of an electric measuring instrument which receives its measuring current from photocell 48.

If key 36 is pressed in the direction shown by the arrow into the camera, a pin 37 on key 36 rotates a crank 38 which is pivotal about an axis shown as a screw 39. The arms of crank 38 are slotted, with one slot 50 having engaged therein pin 37 and the other slot 51 having engaged therein a pin 40 fixed to a slide 13. Slide 13 has slots 43 and 44 receiving guiding pins 41 and 42 which are fixed in the camera. The action of crank 38 is that, upon pressing inwardly of member 36, slide 13 is caused to move to the right in the direction of arrow 47. Thereby, scanning of the measuring position of instrument pointer 6 takes place in the manner already described above in connection with Fig. 1, whereby the following happens:

In the first portion of the path of movement of slide 13 to the right, the inclined surface 14 slips away from under clamping frame 10 so that now spring 11 can move clamping frame 10 to clamp instrument pointer 6 to clamping surface 12.

At the same time, through rack 21 on slide 13 and the gear teeth 20 of scanning member 18, follow-up pointer 23 is moved to the left, i.e. toward instrument pointer 6 until its downward projecting scanning pin 30 abuts instrument pointer 6. Thereby, the follow-up pointer 23 is moved against the weak effect of spring 26, away from its stop 27 and is pressed against clamping surface 7 so that the measuring pointer is immovably clamped by the scanning device.

Fastened to slide 13 is a second rack 33 which is in engagement with pinion 34. This pinion 34 is fixedly connected with shaft 35 through which, the exposure value adjuster—which is designed, for example, as an adjusting ring—of the shutter 32 is adjusted. Thus if the key 36 was pressed down to such an extent that the follow-up pointer 23 abutted instrument pointer 6 and blocked the scanning device, at the same time, through shaft 35, the exposure value adjuster of shutter 32 was adjusted to the correct measured value in the respective case. Thereafter the camera shutter can be released by shutter release key 45. If, subsequently, the operator releases knob 36, spring 15 will return slide 13, as well as the complete scanning device, to the initial position, so that the instrument pointer can again move freely.

It will be understood from the above that this invention is not limited to the details specifically described above and illustrated in the drawings and can be carried out with various modifications without departing from the scope of the invention as defined in the appended claims.

What is claimed is:

1. A mechanical scanning device for the indicating position of the pointer of a photographic exposure meter movable over an indicating range, said device comprising, in combination, means forming a supporting surface extending through the range of movement of the pointer; a clamping member movable between a clamping position clamping the pointer against said surface and a release position providing for free movement of the pointer; means operable to move said clamping member between its two positions; a carrier element rotatable about a fixed axis; a pointer member pivotally mounted on said element, having a free end arranged to follow the movement of the pointer and having a rest position outside the indicating range of the pointer and a scanning position relative to the pointer; a stop fixed on said element; a relatively weak tension spring biasing said pointer member to engage said stop; means forming a circular arcuate clamping surface cooperable with the free end of said pointer member for arresting said pointer member in its scanning position, the free end of said pointer member being spaced a short distance from said clamping surface except in the scanning position of said pointer member; said pointer member, when engaged with said stop, forming, with the radius of said clamping surface, an angle less than the angle of friction between the free end of said pointer member and said clamping surface; and means operable to rotate said element about its axis to move said pointer member toward its scanning position; said pointer member, when contacting the pointer in its scanning position, being swung away from said stop to frictionally engage its free end with said clamping surface to lock said pointer member and the components of the scanning device in the indicating position of the exposure meter.

2. A device as claimed in claim 1 in which said carrier element comprises a disk-shaped member formed with gear teeth along a sector of its periphery and rotatable through a range corresponding to the indicating range of the pointer; said clamping member comprising a frame-like component; said second-named means including a spring effective to bias said frame-like component to the pointer clamping position; the means operable to rotate said carrier element including a rack engaged with the teeth on said disk-shaped member and movable in a first direction to effect movement of said pointer member to its scanning position, and in a second direction opposite to said first direction; said rack being formed with an inclined surface extending longitudinally thereof and engageable with said frame-like component, during movement of said rack in said second direction, to move said frame-like component to the release position in the rest position of said pointer member.

3. A device as claimed in claim 1 in which said carrier element comprises a relatively elongated arm rotatable about such fixed axis; said pointer member comprising a scanning element pivotal above a pivot adjacent the free end of said arm.

4. A device as claimed in claim 2 including a base member; an electric exposure meter mounted on said base member and including a rotating coil mounted in a pair of bearings; the axis of rotation of said carrier element being coaxial with the rotating coil; said carrier element being rotatably mounted on an extension of said base member carrying one of said bearings and extending beyond said one bearing.

5. A device as claimed in claim 3 in which the pivotal axes of the pointer of the exposure meter and of said relatively elongated arm are located on the bisector of the angle defining the indicating range of the pointer of the exposure meter.

6. In a photographic camera including an electric exposure meter built thereinto and having a rotating coil and an exposure meter pointer movable with said coil over an indicating range: a mechanical scanning device for the indicating position of the exposure pointer meter, comprising, in combination, means forming a supporting surface extending through the range of movement of the pointer; a frame-like clamping component pivotally mounted in the camera for movement between a clamping position clamping the pointer against said surface and a release position providing for free movement of the pointer; spring means biasing said clamping component to the clamping position; a disk-shaped carrier element rotatable about a fixed axis in said camera, through a range corresponding to the indicating range of the pointer, and having a peripheral sector formed with gear teeth; a pointer member pivotally mounted on said element, having a free end arranged to follow the movement of the pointer and having a rest position outside the indicating range of the pointer and a scanning position relative to the pointer; a stop fixed on said carrier element; a relatively weak tension spring biasing said pointer member to engage said stop; means forming a circular arcuate clamping surface cooperable with the free end of said pointer member for arresting said pointer member in its scanning position; the free end of said pointer member being spaced a short distance from said clamping surface except in the scanning position of said pointer member; said pointer member when engaged with said stop, forming, with the radius of said clamping surface, an angle less than the angle of friction between the free end of said pointer member and said clamping surface; a slide mounted for longitudinal reciprocation in the camera and provided with a first rack meshing with the gear teeth on said carrier element; said slide being movable in a first direction to effect rotation of said carrier element to move said pointer member toward its scanning position, and in a second direction opposed to said first direction; said pointer member, when contacting the pointer in its scanning position, being swung away from said stop to frictionally engage its free end with said clamping surface to lock said pointer member, said carrier element, and said slide against further movement in a scanning direction; said slide being formed with an inclined surface extending longitudinally thereof and engageable with said frame-like component to move the same to the release position, upon movement of said slide in said second direction, in the rest position of the pointer member; an exposure value adjusting component; a shaft operatively connected to said adjusting component; and a pinion operatively connected to said adjusting component; and a pinion fixed on said shaft; said slide being formed with a second rack meshing with said pinion and operating said adjusting member through said pinion and said shaft.

7. A photographic camera as claimed in claim 6 including a manually operable key; a crank oscillatably mounted in said camera and having one arm pivotally and slidably connected to said key and the other arm pivotally and slidably connected to said slide for effecting movement of said slide in such one direction upon operation of said key; and a tension spring connected to said slide and effective to move the same in such second direction upon release of said key.

8. A device as claimed in claim 2 in which the frame-like component is pivotally mounted at a pair of opposed pivotal points; the inclined surface being so located on said rack that it engages said frame-like component and moves the same to the release position after a short movement of said rack in said second direction.

References Cited in the file of this patent

UNITED STATES PATENTS

| 2,132,306 | Linke | Oct. 4, 1938 |
| 2,188,820 | Riszdorfer | Jan. 30, 1940 |
| 2,206,626 | Blechner | July 2, 1940 |
| 2,222,292 | Gorlich | Nov. 19, 1940 |
| 2,932,242 | Greger | Apr. 12, 1960 |
| 2,937,582 | Goshima | May 24, 1960 |